United States Patent
Buryak et al.

(10) Patent No.: US 10,414,910 B2
(45) Date of Patent: Sep. 17, 2019

(54) HDPE

(71) Applicants: Abu Dhabi Polymers Company Limited (Borouge) LLC, Abu Dhabi (AE); Borealis AG, Vienna (AT)

(72) Inventors: Andrey Buryak, Abu Dhabi (AE); Ashish Kumar, Abu Dhabi (AE)

(73) Assignees: Abu Dhabi Polymers Company Limited (Borouge) LLC, Abu Dhabi (AE); Borealis AG, Vienna (AT)

(*) Notice: Subject to any disclaimer, the term of this patent is extended or adjusted under 35 U.S.C. 154(b) by 0 days.

(21) Appl. No.: 15/540,094

(22) PCT Filed: Dec. 29, 2015

(86) PCT No.: PCT/EP2015/081345
§ 371 (c)(1),
(2) Date: Jun. 27, 2017

(87) PCT Pub. No.: WO2016/107869
PCT Pub. Date: Jul. 7, 2016

(65) Prior Publication Data
US 2018/0022905 A1   Jan. 25, 2018

(30) Foreign Application Priority Data
Dec. 30, 2014 (EP) .................................. 14200666

(51) Int. Cl.
*C08L 23/06* (2006.01)
*C08L 23/04* (2006.01)
*C08L 23/08* (2006.01)
*C08F 2/00* (2006.01)

(52) U.S. Cl.
CPC .............. *C08L 23/06* (2013.01); *C08L 23/04* (2013.01); *C08L 23/0815* (2013.01); *C08F 2/001* (2013.01); *C08L 2207/062* (2013.01); *C08L 2314/02* (2013.01)

(58) Field of Classification Search
CPC ...... C08L 23/04; C08L 23/06; C08L 23/0815; C08L 2207/062; C08L 2314/02; C08F 2/001
See application file for complete search history.

(56) References Cited

U.S. PATENT DOCUMENTS

| | | |
|---|---|---|
| 5,326,835 A | 7/1994 | Ahvenainen et al. |
| 5,684,097 A | 11/1997 | Palmroos et al. |
| 5,767,034 A | 6/1998 | Diaz-Barrios et al. |
| 6,034,026 A | 3/2000 | Garoff et al. |
| 6,462,161 B1 | 10/2002 | Cady et al. |
| 7,432,220 B2 | 10/2008 | Garoff et al. |
| 7,750,083 B2 | 7/2010 | De Cambry De Baudimont et al. |
| 8,044,160 B2 | 10/2011 | Nord-Varhaug et al. |
| 9,090,761 B2 | 7/2015 | Mannebach et al. |
| 9,359,493 B2 | 6/2016 | Ribour et al. |
| 9,441,062 B2 | 9/2016 | Buryak et al. |
| 2006/0241256 A1 | 10/2006 | Baann et al. |

FOREIGN PATENT DOCUMENTS

| | | |
|---|---|---|
| EP | 1655339 | 11/2004 |
| EP | 2130860 | 6/2008 |
| JP | 2007284667 | 11/2007 |
| WO | 00/71615 | 11/2000 |

OTHER PUBLICATIONS

Heino, E-L. et al., "Rheological Characterization of Polyethylene Fractions" Theoretical and Applied Rheology, 1992.

*Primary Examiner* — Nathan M Nutter
(74) *Attorney, Agent, or Firm* — Diederiks & Whitelaw, PLC.

(57) ABSTRACT

A multimodal polyethylene copolymer comprising:
(III) 35 to 55 wt % of a lower molecular weight ethylene homopolymer component having an $MFR_2$ of 200 to 400 g/10 min;
(IV) 45 to 65 wt % of a higher molecular weight ethylene copolymer component of ethylene and at least one C3-12 alpha olefin comonomer;
wherein said multimodal polyethylene copolymer has a density of 955 to 962 kg/m$^3$, an $MFR_2$ of 2.0 to 10 g/10 min and an Mw/Mn of more than 9.0.

20 Claims, No Drawings

HDPE

CROSS-REFERENCE TO RELATED APPLICATIONS

This application represents the U.S. National Phase of International Application number PCT/EP2015/081345 entitled "HDPE" filed 29 Dec. 2015, which claims priority from and the benefit of European patent application No. 14200666.7 filed on 30 Dec. 2014. The entire contents of these applications are incorporated herein by reference.

The present invention relates to a high density polyethylene polymer for compression or injection moulded articles, in particular for the manufacture of caps and closures. The present invention also relates to a process for the production of said polymer, a process for the production of a compression or injection moulded article comprising said polymer and to the use of said polymer for the production of a compression or injection moulded article such as a cap or closure.

The polyethylene of the invention is a multimodal high density polyethylene copolymer with a desirable balance of rheological, processing and mechanical properties. The specific combination of polymer design parameters (e.g. the molecular weights of lower and higher molecular weight fractions and distribution thereof, as well as the split between the fractions and final MFR and density) were found to provide a polymer with good flow, good rheological and good mechanical properties, e.g. in terms of environmental stress crack resistance (ESCR), impact strength and stiffness.

BACKGROUND

Injection moulding may be used to make a wide variety of articles including articles having relatively complex shapes and a range of sizes. Injection moulding is, for instance, suited to the manufacture of articles used as caps and closures for food and drink applications, such as for bottles containing carbonated or non-carbonated drinks, or for non-food applications like containers for cosmetics and pharmaceuticals.

Injection moulding is a moulding process in which a polymer is melted and then filled into a mould by injection. During initial injection, high pressure is used and the polymer melt is compressed. Thus, upon injection into the mould the polymer melt initially expands or "relaxes" to fill the mould. The mould, however, is kept at a lower temperature than the polymer melt. As the polymer melt cools, shrinkage tends to occur. To compensate for this effect, back pressure is applied. Thereafter the polymer melt is cooled further to enable the moulded article to be removed from the mould without causing deformation.

An important property of an injection moulded article is its stress crack resistance. It will be appreciated that the injection moulded articles of the invention should not exhibit brittle failure and should therefore possess a high stress crack resistance. The present inventors therefore sought new HDPEs, developed in particular for the cap and closure market, which possess improved stress cracking resistance.

The HDPE should also offer injection moulded articles with high impact strength so the articles withstand being dropped and withstand transportation.

It is also important that produced articles (e.g. caps or closures) having sufficient mechanical strength (rigidity) implying that the HDPE resin should have sufficient stiffness.

Improvements in these mechanical properties must not be at the expense of processability of the polymer. Processability must be maintained or even improved to meet customer needs. Injection moulded articles are produced rapidly and any reduction in processability can increase cycle times and hence reduce process efficiency. To achieve high production speed and hence a process with improved economics, it is important for the resin to have very good flow, in particular flow under pressure (i.e. good rheology).

It is therefore required that the HDPE resin which is used to produce beverage cap or closure has a balance of mechanical and rheological properties. The improvement of one of the properties above however, leads to a reduction in another equally valuable property. For example, stiffness can be increased by increasing polymer density. Unfortunately this will reduce the resistance to crack propagation. Likewise, resin flow can be improved by increasing its melt flow rate but only at the expense of impact resistance. Therefore, it is not easy to achieve the desired balance required properties.

The invention also relates to the preparation of compression moulded articles. Compression moulding is a method of moulding in which the molding material, generally preheated, is first placed in an open, heated mould cavity. The mould is closed, pressure is applied to force the material into contact with all mould areas, while heat and pressure are maintained until the moulding material has set. In injection molding processes, the polymer melt flows under high shear rates and flow ability measured by spiral flow provides a good indication on how the polymer will flow in the mold. In compression molding processes the situation is different. As the polymer melt is not subjected to high shear rates, polymer flow is proportional to MFR of the resin. It is possible that a low MFR HDPE has high spiral flow (due to high shear thinning) but this will not necessarily translate to good flow in a compression molding process. In this respect, the high melt flow of the inventive examples is beneficial to achieve good flow in a compression molding process while high spiral flow gives good flow ability in an injection molding process. Many prior art examples fail to achieve such combination.

The present inventors have therefore devised a narrowly defined multimodal HDPE copolymer that possesses excellent mechanical properties, good flow for both compression and injection moulding and high processability.

Some bimodal HDPE compositions are known. In EP-A-1,565,525 the inventors describe a bimodal HDPE, preferably for blow moulding applications. It has a high molecular weight component which possesses high short chain branching. That is achieved however using a single site catalyst and results in a narrow Mw/Mn. The narrow Mw/Mn makes these polymers less processable and they have poor flow.

WO2010/022941 describes an HDPE for injection moulding possessing good ESCR and flow. The polymer is however, made using an obscure dualsite catalyst and relies on a catalyst comprising a single site catalyst and an iron based catalyst. Such a catalyst is not favoured industrially, as a process involving a dualsite catalyst is necessarily limiting as the conditions cannot be varied between polymerisation stages. The formed polymer in '941 is one based on two copolymer fractions and it is impossible to prepare a homopolymer/copolymer using a dualsite catalyst as described in '941.

WO2013/045663 describes bimodal HDPE's with low melt index with good rigidity and ESCR. These can be used for caps and closures. Unusually, the polymer is made with the lower density component in the first stage of the process, that component having low melt index. In the examples, no experimental conditions or comonomers are mentioned, although the final blend has a low $MFR_2$.

WO2014/180989 describes multimodal polymers for cap and closure manufacture with excellent stress crack and tensile properties that lead to a reduction of angel hair and high tips on forming caps. These polymers have low MFR.

JP4942525 describes a polyethylene resin composition for a bottle cap having an excellent rigidity and excellent high speed molding property without reducing environmental stress cracking resistance. The polymer is a multimodal HDPE having homopolymer and copolymer components and an MFR of 5.0 to 10.0 g/10 min, a density is 0.960 to 0.967 g/cm$^3$, and an Mw/Mn of 8.0 to 12.0.

WO03/039984 describes screw caps made from a bimodal polyethylene in which an ethylene homopolymer is combined with an ethylene copolymer fraction. The caps possess good ESCR, injectability and impact resistance. The polyethylenes therein are generally of lower $MFR_2$ than we require and are primarily targeted at caps for carbonated beverages. Such caps require very high ESCR which is achieved by keeping melt flow and densities at lower level.

The present inventors have found that a particular combination of properties leads to an ideal balance of mechanical properties, rheological properties and processability. By manufacturing a multimodal HDPE with high melt index having an ethylene homopolymer lower molecular weight fraction in combination with a higher molecular weight copolymer fraction gives excellent properties. The invention has been compared to a broad range of commercial moulding HDPE grades of comparable densities to show that the relationships in claim 1 are not ones which can be found in commercial polymers and which yield the advantageous properties highlighted above.

The combination of tailored flow, good stiffness, good rheology and good stress crack is achieved using a blend in which the LMW ethylene homopolymer has very high melt index (and hence low Mw) and high density combined with a HMW component that results in an overall density and $MFR_2$ which is higher than some conventional solutions. Surprising, despite the higher density we maintain high ESCR which might be expected to fall. Our flow is also in the ideal range for injection moulding. The invention is ideally suited to the manufacture of caps for non-carbonated beverage containers as the inventive compositions provide very good balance between flow ability, stiffness and stress cracking resistance.

SUMMARY OF INVENTION

Viewed from one aspect the invention provides a multimodal polyethylene copolymer comprising:
(I) 35 to 55 wt % of a lower molecular weight ethylene homopolymer component having an $MFR_2$ of 200 to 400 g/10 min;
(II) 45 to 65 wt % of a higher molecular weight ethylene copolymer component of ethylene and at least one C3-12 alpha olefin comonomer;
wherein said multimodal polyethylene copolymer has a density of 955 to 962 kg/m$^3$, an MFR, of 2.0 to 10.0 g/10 min and an Mw/Mn of more than 9.0.

The multimodal polyethylene copolymer of the invention is made using a Ziegler Natta catalyst.

Viewed from another aspect the invention provides an injection or compression moulded article, such as a cap or closure, comprising a multimodal polyethylene copolymer as herein before defined. Such caps or closures may weight from 1 to 10 g.

Viewed from another aspect the invention provides the use of the multimodal polyethylene copolymer as hereinbefore defined in the manufacture of an injection moulded or compression article, such as a cap or closure.

Viewed from another aspect the invention provides a process for the preparation of a multimodal polyethylene copolymer as herein before defined comprising;
polymerising ethylene in the presence of a Ziegler Natta catalyst so as to form said lower molecular weight homopolymer component (I); and subsequently
polymerising ethylene and at least one C3-12 alpha olefin comonomer in the presence of component (I) and in the presence of the same Ziegler Natta catalyst so as to form said higher molecular weight component (II) and hence form said multimodal polyethylene copolymer as herein before defined.

The invention further comprises compression or injection moulding the product of said process to form an article, such as a cap or closure.

DEFINITIONS

The multimodal polyethylene copolymer of the invention comprises a ethylene homopolymer component or fraction which contains only ethylene monomer residues and a polyethylene copolymer component or fraction which comprises ethylene copolymerised with at least one C3-12 alpha olefin. The terms component and fraction can be used interchangeably herein.

All parameters mentioned above and below are measured according to test methods set out before the examples.

DETAILED DESCRIPTION OF INVENTION

It has been found that the high density polyethylene copolymer according to the invention provides an improved material for compression or especially injection moulding, in particular for cap and closure applications, which combines very good mechanical properties e.g. in terms of ESCR, with excellent processability and ideal flow, e.g. in terms of shear thinning index and spiral flow.

The polymer of the invention is a multimodal high density ethylene copolymer as it contains an ethylene copolymer fraction. In an ethylene copolymer fraction, the majority by mole of monomer residues present are derived from ethylene monomer units. The comonomer contribution in the HMW component preferably is up to 10% by mol, more preferably up to 5% by mol in any copolymer fraction. Ideally, however there are very low levels of comonomer present in any copolymer fraction such as 0.1 to 3.0 mol %, e.g. 0.5 to 2.0 mol %.

The overall comonomer content in the multimodal polyethylene copolymer as a whole may be 0.05 to 3.0 mol % e.g. 0.1 to 2.0 mol %, preferably 0.2 to 1.0 mol %.

The copolymerisable monomer or monomers present in any copolymer component are C3-12 alpha olefin comonomers, particularly singly or multiply ethylenically unsaturated comonomers, in particular C3-12-alpha olefins such as propene, but-1-ene, hex-1-ene, oct-1-ene, and 4-methylpent-1-ene. The use of 1-hexene and 1-butene is particularly preferred. Ideally there is only one comonomer present. Ideally that comonomer is 1-butene.

The polymer of the invention is multimodal and therefore comprises at least two components. It is generally preferred if the higher molecular weight (HMW) component has an Mw of at least 5000 more than the lower molecular weight (LMW) component, such as at least 10,000 more. Alternatively viewed, the MFR$_2$ of the HMW component is lower than the MFR$_2$ of the LMW component.

The HDPE of the invention is multimodal. Usually, a polyethylene composition comprising at least two polyethylene fractions, which have been produced under different polymerisation conditions resulting in different (weight average) molecular weights and molecular weight distributions for the fractions, is referred to as "multimodal". Accordingly, in this sense the compositions of the invention are multimodal polyethylenes. The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

It is preferred if the polymer of the invention is bimodal.

The polymer of the invention has an MFR$_2$ of 2.0 to 10.0 g/10 min, preferably 2.0 to 5.0 g/10 min. The polymer preferably has an MFR$_2$ of 2.0 to 4.9 g/10 min. Most preferably, the MFR$_2$ may be of 2.5 to 4.9 g/10 min, preferably 3.0 to 4.9 g/10 min.

The polymer of the invention preferably has an MFR$_5$ of 11.0 to 18.0 g/10 min., preferably 12-16 g/10 min.

The density of the multimodal ethylene copolymer is 955 to 962 kg/m$^3$. The polymers of the invention are therefore high density polyethylenes, HDPE. More preferably, the polymer has a density of 956 to 962 kg/m$^3$, such as 956 to 960 kg/m$^3$, especially 956 to 959 kg/m$^3$. In certain embodiments the density of the copolymer of the invention is less than 960 kg/m$^3$.

Preferably, the polymers of the invention possess an ESCR of 20 hrs or more, such as 25 hrs or more. An ESCR in the range of 20 to 70 hrs, especially 25 to 59 hrs is preferred.

It will be appreciated that the molecular weight and molecular distribution of the polymers of the invention is important. The polyethylene polymer has a molecular weight distribution Mw/Mn, being the ratio of the weight average molecular weight Mw and the number average molecular weight Mn, of more than 9.0, more preferably more than 10.0, such as 10.0 to 20.0, preferably 10.5 to 18.0.

The multimodal ethylene copolymer preferably has an Mw/Mn of 30.0 or below, more preferably of 25.0 or below, even more preferably of 20.0 or below.

The weight average molecular weight Mw of the multimodal ethylene copolymer of the invention preferably is at least 50,000, more preferably at least 70,000. Furthermore, the Mw of the composition preferably is at most 200,000, more preferably at most 150,000.

The Mz of the multimodal polyethylene copolymer of the invention is preferably 300,000 to 500,000. The ratio of Mz/Mw is preferably in the range of 2.0 to 7.0, such as 3.5 to 5.5.

The shear thinning index (SHI 2.7/210) may be at least 6.0, such as at least 7.0. Ideally the SHI is in the range of 7.0 to 18.0, preferably 8.0 to 15.0.

The charpy impact strength measured at 23° C. may be 4.0 to 10.0 kJ/m$^2$, such as 5.0 to 8.0 kJ/m$^2$.

The flow properties of the multimodal polyethylene copolymer of the invention are important. Too little flow or too much flow limits the utility of the polyethylene. At 190° C., the spiral flow length at 600 bar pressure may be 9.0 to 15.0 cm, preferably 10.0 to 14.0 cm. Under the same conditions of 190° C. at 1000 bar pressure, the length may be 14.0 to 21.0 cm, preferably 15.0 to 19.0 cm, especially 16.0 to 19.0 cm. At 1400 bar pressure, 190° C., flow length may be 18.0 to 25.0 cm, preferably 19.0 to 24.0 cm.

At 220° C., flow length at 600 bar may be 10.0 to 15.0 cm, preferably 11.0 to 14.0 cm. At 1000 bars flow length may be 16.0 to 24.0 cm, preferably 17.0 to 22.0 cm, especially 17.5 to 20.0 cm. At 1400 bars flow length may be 20.0 to 30.0 cm, preferably 22.0 to 26.0 cm.

It is the combination of high density, high overall MFR$_2$, high MFR$_2$ in the LMW component and broad Mw/Mn that contributes to the excellent flow properties, good rheology and good ESCR that we observe. The high final MFR and high loop MFR are important to achieve good rheological properties and consequently good flowability both for compression and injection moulding. High density of LMW and final bimodal copolymer, bimodality (Mw/Mn) and homopolymer/copolymer component design (including the split) is important to achieve good stiffness-ESCR combination.

As noted above, the polymers of the invention preferably comprise a lower molecular weight component (I) and a higher molecular weight component (II). The weight ratio of LMW fraction (I) to HMW fraction (II) in the composition is in the range 35:65 to 55:45, more preferably 40:60 to 55:45, most preferably 48:52 to 52:48. It has been found therefore that the best results are obtained when the HMW component is present at around the same percentage as the LMW component or even predominates, e.g. 48 to 52 wt % of the HMW component (II) and 52 to 48 wt % fraction (I).

An ideal polymer is therefore a lower molecular weight homopolymer component (I) with a higher molecular weight component (II) which is an ethylene 1-butene component.

The lower molecular weight fraction (I) has an MFR$_2$ of 200 to 400 g/10 min g/10 min. A range of 250 to 350 g/10 min is preferred. This high MFR$_2$ in the LMW fraction ensures that there is a large difference in Mw between LMW and HMW components and is important in giving the multimodal polyethylene copolymer of the invention the good rheological properties and ideal flow as well as good ESCR which we observe.

Fraction (I) is an ethylene homopolymer with a preferred density of 965 to 975 kg/m$^3$, preferably 968 to 972 kg/m$^3$.

The HMW component is an ethylene copolymer. Its properties are chosen such that the desired final density and MFR are achieved. It has a lower MFR$_2$ than the LMW component and a lower density. Ideally it is a copolymer of ethylene and 1-butene.

Where herein features of fractions (I) and/or (II) of the composition of the present invention are given, these values are generally valid for the cases in which they can be directly measured on the respective fraction, e.g. when the fraction is separately produced or produced in the first stage of a multistage process. However, the composition may also be and preferably is produced in a multistage process wherein e.g. fractions (I) and (II) are produced in subsequent stages. In such a case, the properties of the fractions produced in the second step (or further steps) of the multistage process can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated based on the properties of both the fraction produced in prior stage and the final product, e.g. in accordance with B. Hagström, Conference on Polymer Processing (The Polymer Processing Society), Extended Abstracts and Final Programme, Gothenburg, Aug. 19 to 21, 1997, 4:13.

Thus, although not directly measurable on the multistage process products, the properties of the fractions produced in higher stages of such a multistage process can be determined by applying either or both of the above methods. The skilled person will be able to select the appropriate method.

A multimodal (e.g. bimodal) polyethylene as hereinbefore described may be produced by mechanical blending two or more polyethylenes (e.g. monomodal polyethylenes) having differently centred maxima in their molecular weight distributions. The monomodal polyethylenes required for blending may be available commercially or may be prepared using any conventional procedure known to the skilled man in the art. Each of the polyethylenes used in a blend and/or the final polymer composition may have the properties hereinbefore described for the lower molecular weight component, and higher molecular weight component of the composition, respectively.

However, it is preferred if the copolymer of the invention is formed in a multistage process. The process of the invention preferably involves polymerising ethylene so as to form a lower molecular weight homopolymer component (I) as herein defined; and subsequently polymerising ethylene and at least one C3-12 alpha olefin comonomer in the presence of component (I) so as to form a higher molecular weight component (II) and hence to form the desired multimodal polyethylene copolymer of the invention. The same Ziegler Natta catalyst is used in both stages of the process and is transferred from step (I) to step (II) along with component (I).

It is preferred if at least one component is produced in a gas-phase reaction.

Further preferred, one of the fractions (I) and (II) of the polyethylene composition, preferably fraction (I), is produced in a slurry reaction, preferably in a loop reactor, and one of the fractions (I) and (II), preferably fraction (II), is produced in a gas-phase reaction.

Preferably, the multimodal polyethylene composition may be produced by polymerisation using conditions which create a multimodal (e.g. bimodal) polymer product using a Ziegler Natta catalyst system using a two or more stage, i.e. multistage, polymerisation process with different process conditions in the different stages or zones (e.g. different temperatures, pressures, polymerisation media, hydrogen partial pressures, etc).

Preferably, the multimodal (e.g. bimodal) composition is produced by a multistage ethylene polymerisation, e.g. using a series of reactors, with optional comonomer addition preferably in only the reactor(s) used for production of the higher/highest molecular weight component(s). A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, batch reactors etc. (see for example WO97/44371 and WO96/18662).

Polymer compositions produced in a multistage process are also designated as "in-situ" blends.

It is previously known to produce multimodal, in particular bimodal, olefin polymers, such as multimodal polyethylene, in a multistage process comprising two or more reactors connected in series. As instance of this prior art, mention may be made of EP 517 868, which is hereby incorporated by way of reference in its entirety, including all its preferred embodiments as described therein, as a preferred multistage process for the production of the polyethylene composition according to the invention.

Preferably, the main polymerisation stages of the multistage process for producing the composition according to the invention are such as described in EP 517 868, i.e. the production of fractions (I) and (II) is carried out as a combination of slurry polymerisation for fraction (0/gas-phase polymerisation for fraction (II). The slurry polymerisation is preferably performed in a so-called loop reactor. Further preferred, the slurry polymerisation stage precedes the gas phase stage.

Optionally and advantageously, the main polymerisation stages may be preceded by a prepolymerisation, in which case up to 20% by weight, preferably 1 to 10% by weight, more preferably 1 to 5% by weight, of the total composition is produced. The prepolymer is preferably an ethylene homopolymer (High Density PE). At the prepolymerisation, preferably all of the catalyst is charged into a loop reactor and the prepolymerisation is performed as a slurry polymerisation. Such a prepolymerisation leads to less fine particles being produced in the following reactors and to a more homogeneous product being obtained in the end. Any prepolymer is considered a part of the LMW component herein.

The polymerisation catalyst is a Ziegler-Natta (ZN) catalyst. The catalyst may be supported, e.g. with conventional supports including magnesium dichloride based supports or silica. Preferably the catalyst is a ZN catalyst, more preferably the catalyst is silica supported ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention reference is made to WO2004055068 and WO2004055069 of Borealis, EP 0 688 794 and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

The resulting end product consists of an intimate mixture of the polymers from the two or more reactors, the different molecular-weight-distribution curves of these polymers together forming a molecular-weight-distribution curve having a broad maximum or two or more maxima, i.e. the end product is a multimodal polymer mixture, such as bimodal mixture.

It is preferred that the base resin, i.e. the entirety of all polymeric constituents, of the composition according to the invention is a bimodal polyethylene mixture consisting of fractions (I) and (II), optionally further comprising a small prepolymerisation fraction in the amount as described above. It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively lower molecular polymer having no content of comonomer is produced in one stage, preferably the first stage, owing to a high content of chain-transfer agent (hydrogen gas), whereas the higher molecular polymer having a content of comonomer is produced in another stage, preferably the second stage.

In the preferred embodiment of the polymerisation in a loop reactor followed by a gas-phase reactor, the polymerisation temperature in the loop reactor preferably is 85 to 115° C., more preferably is 90 to 105° C., and most preferably is 92 to 100° C., and the temperature in the gas-phase reactor preferably is 70 to 105° C., more preferably is 75 to 100° C., and most preferably is 82 to 97° C.

A chain-transfer agent, preferably hydrogen, is added as required to the reactors, and preferably 100 to 800 moles of $H_2$/kmoles of ethylene are added to the reactor, when the LMW fraction is produced in this reactor, and 50 to 500 moles of $H_2$/kmoles of ethylene are added to the gas phase reactor when this reactor is producing the HMW fraction.

In the production of the composition of the present invention, preferably a compounding step is applied, wherein the composition of the base resin, i.e. the blend, which is typically obtained as a base resin powder from the reactor, is extruded in an extruder and then pelletised to polymer pellets in a manner known in the art.

The polyethylene composition, e.g. in pellet form, may also contain minor quantities of additives such as pigments, nucleating agents, antistatic agents, fillers, antioxidants, etc., generally in amounts of up to 10% by weight, preferably up to 5% by weight.

Optionally, additives or other polymer components can be added to the composition during the compounding step in the amount as described above. Preferably, the composition of the invention obtained from the reactor is compounded in the extruder together with additives in a manner known in the art.

The polyethylene polymer of the invention may also be combined with other polymer components such as other polymers of the invention, with other HDPEs or with other polymers such as LLDPE or LDPE. However articles of the invention such as caps and closures are preferably at least 90 wt % of the polymer of the invention, such as at least 95 wt %. In one embodiment, the articles consist essentially of the polymer of the invention. The term consists essentially of means that the polymer of the invention is the only "non additive" polyolefin present. It will be appreciated however that an article and also the polymer used to make it may contain standard polymer additives some of which might be supported on a polyolefin (a so called masterbatch as is well known in the art). The term consists essentially of does not exclude the presence of such a supported additive.

Applications

Still further, the present invention relates to an injection or compression moulded article, preferably a cap or closure, comprising a polyethylene composition as described above and to the use of such a polyethylene composition for the production of an injection or compression moulded article, preferably a cap or closure. Preferably, injection moulded articles are made. The invention is ideally suited to the manufacture of caps for containers such as still water. The caps of the invention is therefore ideal for bottles containing non-carbonated drinks as the inventive compositions provide very good balance between flow ability (spiral flow), stiffness and stress cracking resistance for that application.

Injection moulding of the composition hereinbefore described may be carried out using any conventional injection moulding equipment. A typical injection moulding process may be carried out a temperature of 190 to 275° C.

Still further, the present invention relates to a compression moulded article, preferably a caps or closure article, comprising a polyethylene polymer as described above and to the use of such a polyethylene polymer for the production of a compression moulded article, preferably a cap or closure.

Preferably, the composition of the invention is used for the production of a caps or closure article.

As noted above, the caps and closures of the present invention are advantageous not only because of their high ESCR properties, but also because they have ideal flow.

The caps and closures of the invention are of conventional size, designed therefore for bottles and the like. They are approximately 2 to 8 cm in outer diameter (measured across the solid top of the cap) depending on the bottle and provided with a screw. Cap height might be 0.8 to 3 cm.

Caps and closure may be provided with tear strips from which the cap detaches on first opening as is well known in the art. Caps may also be provided with liners.

It will be appreciated that any parameter mentioned above is measured according to the detailed test given below. In any parameter where a narrower and broader embodiment are disclosed, those embodiments are disclosed in connection with the narrower and broader embodiments of other parameters.

The invention will now be described with reference to the following non limiting examples.

Test Methods:

Melt Flow Rate

The melt flow rate (MFR) is determined according to ISO 1133 and is indicated in g/10 min. The MFR is an indication of the melt viscosity of the polymer. The MFR is determined at 190° C. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

The quantity FRR (flow rate ratio) is an indication of molecular weight distribution and denotes the ratio of flow rates at different loads. Thus, $FRR_{21/2}$ denotes the value of $MFR_{21}/MFR_2$.

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Molecular Weight

Molecular weight averages, molecular weight distribution (Mn, Mw, Mz, MWD)

Molecular weight averages (Mz, Mw and Mn), Molecular weight distribution (MWD) and its broadness, described by Mw/Mn (wherein Mn is the number average molecular weight and Mw is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^N A_i}{\sum_{i=1}^N (A_i / M_i)} \tag{1}$$

$$M_w = \frac{\sum_{i=1}^N (A_i \times M_i)}{\sum_{i=1}^N A_i} \tag{2}$$

$$M_z = \frac{\sum_{i=1}^N (A_i \times M_i^2)}{\sum_{i=1}^N (A_i / M_i)} \tag{3}$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS} = 19 \times 10^{-3}$ mL/g, $\alpha_{PS} = 0.655$ $K_{PE} = 39 \times 10^{-3}$ mL/g, $\alpha_{PE} = 0.725$ $K_{PP} = 19 \times 10^{-3}$ mL/g, $\alpha_{PP} = 0.725$ A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

Spiral Flow: measured by using an Arburg Injection moulding machine: Arburg 320 C 600-250 tag 87-LT-E03, Axxicon base mould with spiral mould insert with a thickness of 1 mm and 5 mm broadness, Processing parameters:
Melt temperature should be 190° C. and 220° C.
Injection cycle: injection time including holding: 15.5 sec
Cooling time: 15 sec
Holding pressure: 600 bar, 1000 bar and 1400 bar
Screw speed: 33 rpm
Injection speed: 50 mm/sec
Back pressure 7 bar (system pressure)
Melt cushion: 9 mm
Tool temperature: 40° C.
Plasticizing point: 41 mm
Switch over point: 28 mm The spiral flow test was carried out in the following way:
Properties adjusted as written above.
The cylinder was purged very well before every material.
The test started every time and for every material with the highest holding pressure.
Measurement of spiral flow was not done before the flow length was stable.
Waited at least 10 shots before reading the flow length even it could be stabile before.
Measured 5 injected spirals and calculated the average.

Environmental Stress Crack Resistance

Environmental stress crack resistance (ESCR) was determined according to ASTM 1693, condition B at 50° C. and using 10% Igepal co-630.

Notched Charpy Impact Strength

Notched Charpy impact strength was measured according to ISO 179/1 eA at 23° C. by using injection moulded test specimen (80×10×4 mm), moulded as described in EN ISO 1873-2

Quantification of Microstructure by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. Standard single-pulse excitation was employed utilising the transient NOE at short recycle delays of 3 s {pollard04, klimke06} and the RS-HEPT decoupling scheme {fillip05, griffin07}. A total of 1024 (1 k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {randall89}.

Characteristic signals corresponding to the incorporation of 1-butene were observed (randall89) and all contents calculated with respect to all other monomers present in the polymer.

Characteristic signals resulting from isolated 1-butene incorporation i.e. EEBEE comonomer sequences, were observed. Isolated 1-butene incorporation was quantified using the integral of the signal at 39.84 ppm assigned to the *B2 sites, accounting for the number of reporting sites per comonomer:

$B = I_{*B2}$

With no other signals indicative of other comonomer sequences, i.e. consecutive comonomer incorporation, observed the total 1-butene comonomer content was calculated based solely on the amount of isolated 1-butene sequences:

$B_{total} = B$

The relative content of ethylene was quantified using the integral of the bulk methylene (δ+) signals at 30.00 ppm:

$E = (\frac{1}{2}) * I_{\delta+}$

The total ethylene comonomer content was calculated based the bulk methylene signals and accounting for ethylene units present in other observed comonomer sequences or end-groups:

$E_{total} = E + (5/2) * B$

The total mole fraction of 1-butene in the polymer was then calculated as:

$fB = (B_{total}/(E_{total} + B_{total})$

The total comonomer incorporation of 1-butene in mole percent was calculated from the mole fraction in the usual manner:

$B [\text{mol \%}] = 100 * fB$

The total comonomer incorporation of 1-butene in weight percent was calculated from the mole fraction in the standard manner:

$B [\text{wt \%}] = 100*(fB*56.11)/((fB*56.11)+(fH*84.16)+((1-(fB+fH))*28.05))$ klimke06
Klimke, K., Parkinson, M., Piel, C., Kaminsky, W., Spiess, H. W., Wilhelm, M., Macromol. Chem. Phys. 2006; 207:382.
pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
randall89
J. Randall, Macromol. Sci., Rev. Macromol. Chem. Phys. 1989, C29, 201.
Rheology
The characterization of polymer melts by dynamic shear measurements complies with ISO standards 6721-1 and 6721-10. The measurements were performed on an Anton Paar MCR301 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at T ° C. (T by 230° C. for PP and 190° C. for PE) applying a frequency range between 0.0154 and 500 rad/s and setting a gap of 1.2 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$ and $\gamma_0$ are the stress and strain amplitudes, respectively
ω is the angular frequency
δ is the phase shift (loss angle between applied strain and stress response)
t is the time Dynamic test results are typically expressed by means of several different rheological functions, namely the shear storage modulus, G', the shear loss modulus, G", the complex shear modulus, G*, the complex shear viscosity, η*, the dynamic shear viscosity, η', the out-of-phase component of the complex shear viscosity, η", and the loss tangent, tan η, which can be expressed as follows:

$$G' = \frac{\sigma_0}{\gamma_0} \cos\delta \ [\text{Pa}] \quad (3)$$

$$G'' = \frac{\sigma_0}{\gamma_0} \sin\delta \ [\text{Pa}] \quad (4)$$

$$G^* = G' + iG'' \ [\text{Pa}] \quad (5)$$

$$\eta^* = \eta' - i\eta'' \ [\text{Pa}\cdot\text{s}] \quad (6)$$

$$\eta' = \frac{G''}{\omega} \ [\text{Pa}\cdot\text{s}] \quad (7)$$

$$\eta'' = \frac{G'}{\omega} \ [\text{Pa}\cdot\text{s}] \quad (8)$$

Besides the above mentioned rheological functions one can also determine other rheological parameters such as the so-called elasticity index EI(x). The elasticity index EI(x) is the value of the storage modulus, G' determined for a value of the loss modulus, G" of x kPa and can be described by equation 9.

$$EI(x) = G' \text{ for } (G''=x \text{ kPa})[\text{Pa}] \quad (9)$$

For example, the EI (5 kPa) is the defined by the value of the storage modulus G', determined for a value of G" equal to 5 kPa.

The determination of so-called Shear Thinning Indexes is done, as described in equation 10.

$$SHI(x/y) = \frac{Eta^* \text{ for } (G^* = x \ kPa)}{Eta^* \text{ for } (G^* = y \ kPa)}[\text{Pa}] \quad (10)$$

For example, the SHI (2.7/210) is defined by the value of the complex viscosity, in Pa·s, determined for a value of G* equal to 2.7 kPa, divided by the value of the complex viscosity, in Pa·s, determined for a value of G* equal to 210 kPa. The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "-Interpolate y-values to x-values from parameter" and the "logarithmic interpolation type" were applied.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362
[2] The influence of molecular structure on some rheological properties of polyethylene", Heino, E. L., *Borealis Polymers Oy*, Porvoo, Finland, Annual Transactions of the Nordic Rheology Society, 1995
[3] Definition of terms relating to the non-ultimate mechanical properties of polymers, Pure & Appl. Chem., Vol. 70, No. 3, pp. 701-754, 1998

EXPERIMENTAL

Catalyst Preparation
Complex Preparation:
87 kg of toluene was added into the reactor. Then 45.5 kg Bomag A in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.
Solid Catalyst Component Preparation:
275 kg silica (ES747JR of Crossfield, having average particle size of 20 mm) activated at 600° C. in nitrogen was charged into a catalyst preparation reactor. Then, 411 kg 20% EADC (2.0 mmol/g silica) diluted in 555 liters pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22° C. during ten minutes. The slurry was stirred for 8 hours at 50° C. Finally, 52 kg TiCl$_4$ was added during 0.5 hours at 45° C. The slurry was stirred at 40° C. for five hours. The catalyst was then dried by purging with nitrogen.
The polymers of the invention were prepared as outlined in table 1 in a Borstar process (i.e. a loop followed by gas phase process) using the catalyst above and TEAL cocatalyst:

TABLE 1

|  |  | Ex 1 | Ex 2 | Ex 3 |
|---|---|---|---|---|
| A1 - PREPOLY | Lot |  |  |  |
| temperature | ° C. | 70 | 70 | 70 |
| Pressure | Bar | 62 | 60 | 62 |
| catalyst feed | g/h | 19.8 | 18.9 | 15.4 |
| cocatalyst feed | g/h | 6.0 | 6.8 | 3.1 |

TABLE 1-continued

|  |  | Ex 1 | Ex 2 | Ex 3 |
|---|---|---|---|---|
| C2 feed | kg/h | 2.0 | 2.0 | 2.0 |
| H2 feed | g/h | 4.8 | 4.8 | 4.8 |
| C3 feed | kg/h | 42 | 42 | 43 |
| production rate | kg/h | 1.9 | 1.9 | 1.9 |
| Split | wt-% | 2 | 2 | 2 |
| A2 - LOOP |  |  |  |  |
| temperature | ° C. | 95 | 95 | 95 |
| Pressure | Bar | 57 | 56 | 57 |
| A2 cocatalyst feed | g/h | 7.5 | 6.8 | 3.2 |
| C2 feed | kg/h | 44 | 43 | 38 |
| H2 feed | g/h | 107 | 110 | 93 |
| C4 feed | kg/h | 0.0 | 0.0 | 0.0 |
| C3 feed | kg/h | 84 | 80 | 82 |
| H2/C2 ratio | mol/kmol | 328 | 321 | 369 |
| production rate | kg/h | 40.7 | 40.2 | 36.1 |
| Split | wt-% | 49 | 44 | 38 |
| MFR 190° C. 2.16 kg | g/10 min | 269 | 272 | 290 |
| Density | kg/m3 | ≈971 | 971 | ≈971 |
| A3 - GPR |  |  |  |  |
| temperature | ° C. | 85 | 85 | 85 |
| Pressure | Bar | 20 | 20 | 20 |
| C2 feed | kg/h | 50 | 61 | 77 |
| H2 feed | g/h | 90 | 168 | 300 |
| C4 feed | kg/h | 1.7 | 2.0 | 2.1 |
| H2/C2 ratio | mol/kmol | 141 | 168 | 243 |
| C4/C2 ratio | mol/kmol | 66 | 56 | 45 |
| production rate | kg/h | 40.8 | 49.8 | 56 |
| Split | wt-% | 49 | 54 | 60 |
| comonomer |  | C4 | C4 | C4 |
| FINAL PROPERTIES | Pellet |  |  |  |
| MFR 190° C. 2.16 kg | g/10 min | 4.3 | 4.3 | 4.4 |
| MFR 190° C. 5.0 kg | g/10 min | 14.8 | 14.3 | 14.7 |
| Density by balance | kg/m3 | 957.4 | 958.0 | 957.3 |

Table 2 below shows the comparison of inventive examples with some commercially available prior HDPE grades intended for production of beverage closures. It can be concluded that none of competition products has an optimal balance of rheological and mechanical properties required for the production of beverage closures. The best combination of properties is achieved by inventive example no. 1.

Competitor Grades:

1. ACP5331H (Basell),
2. M200056 (Sabic),
3. C430A (Samsung)
4. CC453 (Sabic)
5. Commercial bimodal HDPE

TABLE 2

Comparison of inventive examples with some prior commercial grades.

| | wt % HMW fraction | MFR2 g/10 min | MFR5 g/10 min | Density kg/m³ | Mn composition (LMW fraction) | Mw composition (LMW fraction) | Mz composition | Mw/Mn (LMW fraction) | Mz/Mw | SHI 2.7/210 | CIS (23° C.) kJ/m² |
|---|---|---|---|---|---|---|---|---|---|---|---|
| Inv Ex 1 | 49 | 4.3 | 14.8 | 957.4 | 7445 (4500) | 83100 (26550) | 409500 | 11.2 (5.9) | 4.9 | 13.2 | 6.5 |
| Inv Ex 2 | 54 | 4.3 | 14.3 | 958 | 8055 (4800) | 83500 (28800) | 418000 | 10.4 (6.0) | 4.5 | 11.8 | 6.7 |
| Inv Ex 3 | 60 | 4.4 | 14.7 | 957.3 | 9115 | 84050 | 396000 | 9.2 | 4.7 | 9.7 | 6.8 |
| M200056 | | 21 | 57 | 956.4 | 12527 | 47900 | 156290 | 3.8 | 3.26 | 3.3 | 3.8 |
| CC453 | | 4.3 | 12 | 951.3 | | | | | | 3.7 | |
| C430A | | 1.8 | 6.1 | 957.3 | 9475 | 101860 | 585390 | 10.8 | 5.75 | 17.5 | 10.1 |
| ACP5331H | | 2.1 | 6.4 | 955.4 | 15472 | 91161 | 351027 | 5.9 | 3.85 | 6.5 | 17.5 |
| Commercial bimodal HDPE | | 4 | | 954 | | | | | | | |

| | Bell ESCR | flow length 600 bar, cm 190° C. | flow length 1000 bar, cm 190° C. | flow length 1400 bar, cm 190° C. | flow length 600 bar, cm 220° C. | flow length 1000 bar, cm 220° C. | flow length 1400 bar, cm 220° C. | Drawback |
|---|---|---|---|---|---|---|---|---|
| Inv Ex 1 | 41 | 12.2 | 17.7 | 22.9 | 13.5 | 19.3 | 24.8 | |
| Inv Ex 2 | 28 | 11.6 | 16.9 | 21.9 | 13 | 18.7 | 23.7 | |
| Inv Ex 3 | 37 | 11.4 | 16.4 | 20.9 | 12.7 | 18.2 | 23.2 | |
| M200056 | 1.2* | 13.7 | 19 | 24.5 | 15.7 | 21.1 | 26.4 | Low impact, low stress cracking resistance |
| CC453 | | 8.8 | 12.2 | 15.1 | | | | Poor flow, poor stiffness (density) |
| C430A | | 9.8 | 14.3 | 19.1 | 11.3 | 16.4 | 21.4 | Insufficient flow |
| ACP5331H | | 7.8 | 11.4 | 15.4 | 9.5 | 13.5 | 17.5 | Poor flow, insufficient stiffness (density) |
| Commercial bimodal HDPE | | 11.2 | 15.8 | 20.8 | 12.9 | 18.2 | 23.5 | Poor flow, insufficient stiffness (density) |

The invention claimed is:

1. A cap or closure comprising a multimodal polyethylene copolymer comprising:
   (I) 35 to 55 wt % of an ethylene homopolymer component having an MFR$_2$ of 200 to 400 g/10 min;
   (II) 45 to 65 wt % of an ethylene copolymer component of ethylene and at least one C3-12 alpha olefin comonomer having a higher molecular weight than the ethylene homopolymer;
   wherein said multimodal polyethylene copolymer has a density of 955 to 962 kg/m³, an MFR$_2$ of 2.0 to 10 g/10 min, an Mw/Mn of more than 9.0 and of 30.0 or below, and a shear thinning index (SHI 2.7/210) in the range of 7.0 to 18.0.

2. A cap or closure as claimed in claim 1 wherein said multimodal polyethylene copolymer has an Mw/Mn of more than 10.0.

3. A cap or closure as claimed in claim 1 wherein said multimodal polyethylene copolymer has an MFR$_2$ of 2.0 to 4.9 g/10 min.

4. A cap or closure as claimed in claim 1 wherein said multimodal polyethylene copolymer is prepared using a Ziegler Natta catalyst.

5. A cap or closure as claimed in claim 1 wherein said copolymer component comprises at least one C3-12 alpha olefin.

6. A cap or closure as claimed in claim 1 wherein said multimodal polyethylene copolymer has 45 to 60 wt % of the ethylene copolymer a component and 40 to 55 wt % of the ethylene homopolymer component.

7. A cap or closure as claimed in claim 1 wherein said multimodal polyethylene copolymer has a shear thinning index (SHI 2.7/210) in the range of 8.0 to 15.0.

8. A cap or closure as claimed in claim 1 wherein said multimodal polyethylene copolymer is a copolymer with a comonomer 1-butene.

9. A cap or closure as claimed in claim 1 wherein said multimodal polyethylene copolymer has an ESCR of more than 20 hrs.

10. A cap or closure as claimed in claim 1 wherein said multimodal polyethylene copolymer has a charpy impact strength measured at 23° C. of 4.0 to 10.0 kJ/m².

11. A cap or closure as claimed in claim 1 wherein a spiral flow length of the multimodal polyethylene copolymer under conditions of 190° C. at 1000 bar pressure is 14.0 to 21.0 cm and/or
    the spiral flow length of the multimodal polyethylene copolymer under conditions of 220° C. at 1000 bars is 16.0 to 24.0 cm.

12. A cap or closure as claimed in claim 1 wherein said multimodal polyethylene copolymer has a density of 956 to 962 kg/m³.

13. A cap or closure as claimed in claim 1 wherein said multimodal polyethylene copolymer comprises:
   (I) 40 to 55 wt % of the weight ethylene homopolymer component having an MFR$_2$ of 200 to 400 g/10 min;
   (II) 45 to 60 wt % of the ethylene copolymer component of ethylene and at least one C3-12 alpha olefin comonomer having a higher molecular weight than the ethylene homopolymer;
   wherein said multimodal polyethylene copolymer has a density of 956 to 959 kg/m³, an MFR$_2$ of 2.0 to 4.9 g/10 min, an ESCR of 20 to 59 hrs, an SHI (2.7/210) of 8.0 to 15.0 and an Mw/Mn of more than 9.0.

14. A cap or closure as claimed in claim 1 which is injection or compression moulded.

15. A process for the preparation of the polyethylene copolymer as claimed in claim 1 comprising:
polymerising ethylene in the presence of a Ziegler Natta catalyst so as to form 35 to 55 wt % of the ethylene homopolymer component having an $MFR_2$ of 200 to 400 g/10 min; and subsequently
polymerising ethylene and the at least one C3-12 alpha olefin comonomer in the presence of the ethylene homopolymer component and in the presence of the same Ziegler Natta catalyst so as to form 65 to 45 wt % of the ethylene copolymer component having a higher molecular weight than the ethylene homopolymer component.

16. A cap or closure as claimed in claim 3 wherein said multimodal polyethylene copolymer has an $MFR_2$ of 3.0 to 4.9 g/10 min.

17. A cap or closure as claimed in claim 5 wherein said copolymer component comprises but-1-ene, hex-1-ene or oct-1-ene.

18. A cap or closure as claimed in claim 6 having 48 to 52 wt % of the ethylene copolymer component and 52 to 48 wt % of the ethylene homopolymer component.

19. A cap or closure as claimed in claim 11 wherein the spiral flow length under conditions of 190° C. at 1000 bar pressure is 16.0 to 19.0 cm and/or
the spiral flow length under conditions of 220° C. at 1000 bars is 17.5 to 20.0 cm.

20. A cap or closure as claimed in claim 13
wherein the spiral flow length under conditions of 190° C. at 1000 bar pressure is 16.0 to 21.0 cm; and/or
the spiral flow length under conditions of 220° C. at 1000 bars is 17.5 to 20.0 cm.

* * * * *